July 14, 1942.  H. NAGEL  2,289,800

DOUBLE EXPOSURE WARNING DEVICE

Filed Sept. 23, 1939

HUGO NAGEL
INVENTOR

BY *(signatures)*
ATTORNEYS

Patented July 14, 1942

2,289,800

UNITED STATES PATENT OFFICE 2,289,800

DOUBLE EXPOSURE WARNING DEVICE

Hugo Nagel, North Harrow, England, assignor to Eastman Kodak Company, Rochester, N. Y., a corporation of New Jersey Application September 23, 1939, Serial No. 296,300

5 Claims. (Cl. 95—31)

The present invention relates to photography, and more particularly to cameras provided with a suitable double exposure warning device.

When taking photographs with a camera not provided with a double exposure prevention arrangement, the operator is liable to forget whether he wound an exposed portion of film across the exposure aperture after making the last exposure.

It has previously been proposed, therefore, to provide a photographic camera with means for preventing actuation of a shutter releasing member before the film is wound on, and to prevent movement of the film winding means when an exposure area of film has been moved into picture-taking position until the shutter releasing means has been actuated.

Photographic cameras fitted with arrangements such as this, however, suffer from the disadvantage that they are expensive to manufacture and require accurate assembly because of the latching devices employed.

It is an object of the present invention to provide a photographic camera with a suitable warning device which is automatically movable to an indicating position upon actuation of the shutter to warn the operator that an exposure has been made.

Another object of the invention is the provision of a warning member of the class described which is automatically moved to an inoperative position when the exposed film is wound onto the takeup roll.

A further object of the invention is the provision of a warning device of this class which is simple in construction, inexpensive to manufacture, eliminates the use of complicated latching devices, and which may be applied to existing cameras with only slight changes therein.

To these and other ends, the invention resides in certain improvements and combinations of parts all as will be hereinafter more fully described, the novel features being pointed out in the claims at the end of the specification.

In the drawing.

Similar reference numerals throughout the various views indicate the same parts.

According to the present invention, a roll film photographic camera is provided with means for indicating to the operator whether the last operation performed was the taking of the exposure, or the winding on of an exposed area of film across the exposure frame. Conveniently, the indicating means may obscure the field of view of a direct vision view finder, or other optical viewing device carried by the camera, upon actuation of the shutter release, and be moved from such position upon winding of the film.

Figure 3:
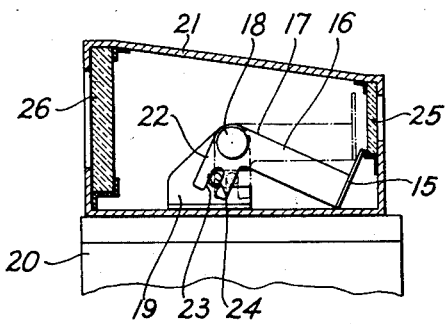
Fig. 3 is a vertical sectional view through the view finder and taken substantially on the line 3—3 of Fig. 2, showing the warning device and the mechanism by which the latter is moved into and out of the view finder field.

In carrying the invention into effect according to the preferred form, the indicating means is moved from its obscure position, see Fig. 3, by means of a shoulder 11 on a cam disk 12 which is mounted to rotate with the film winding means or spindle 13, and is adapted to turn a pivoted lever 14 connected to the indicating means. Preferably, the indicating means comprises a plate member 15 carried by or formed integral with one arm 16 of the bell-crank 17 pivoted at 18 to a support 19 carried by the camera body 20, or formed integral with a direct vision view finder 21, as shown in Fig. 3. The other arm 22 of the bellcrank lever 16 is provided with a slot 23 adapted to receive a pin 24 carried by the pivoted lever or plate shifting member 14. In order to move the plate 15 to the obscuring position in front of the view finder lenses 25 and 26, as shown in dotted lines in Fig. 3, a spring 27 may be provided having one end 28 connected to or engaging a lug 29 formed on the pivoted lever 14, the other end 30 secured to a lug 31 on the camera body 20. It will be apparent that if the plate 15 is moved automatically to the obscuring position, see dotted position, Fig. 3, when an exposure has been made, there must be a connection between the shutter releasing means and the plate 15.

To this end, a bellcrank lever 36 is pivoted at 37 on the camera body 20, and has one arm 38 which carries the pivot 39 of the pivotally mounted lever 14. The other arm 40 of the bellcrank lever may conveniently be acted upon by the shutter releasing means which preferably comprises a reciprocating plugger 41 suitably connected to the shutter mechanism, not shown, and carried by the camera body and having a cam slot 42 cut in the pressure knob 43 to receive an upturned lug 44 on the free arm 40 of the last-mentioned bellcrank lever 36.

With this preferred embodiment of the invention, it will be seen that the indicating mechanism can be mounted on the top wall of a camera between the view finder 21 and the film winding knob 45, thus forming a compact structure which may be closed by a cover plate 46 without detracting from the appearance of the camera. Furthermore, it is possible to apply the device to existing cameras simply by modifying the releasing plunger and the film winding means.

Figure 1:
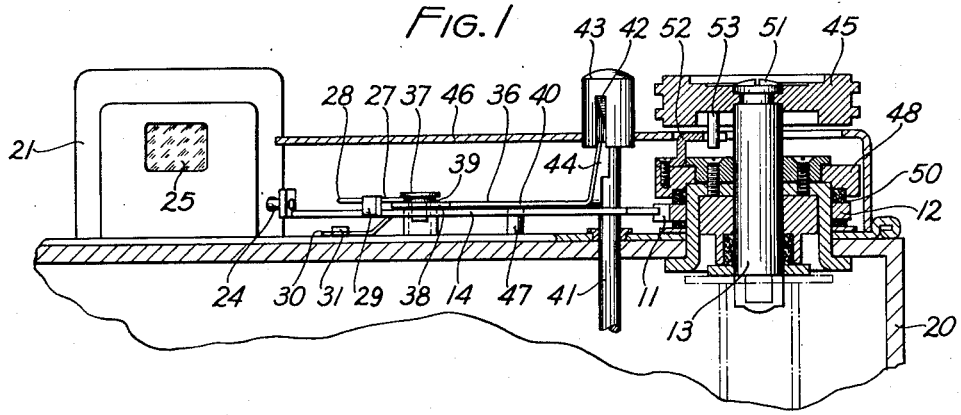
Fig. 1 is a vertical sectional view through a camera of the roll film type, with parts in section and parts in elevation, showing the relation thereto of a double exposure warning device constructed in accordance with the preferred embodiment of the invention.

Unless the film winding means is so arranged that one complete revolution of the cam disk 12 corresponds to the movement of the film a distance equal to one exposure area, it is necessary to provide means whereby the winding spindle 13 may be rotated relative to the cam disk 12 when the shoulder 11 on the latter has moved the pivoted lever 14 against a stop 47 mounted on the camera body 19. For this purpose, the winding knob shaft or spindle 13 preferably carries the cam disk 12 loosely mounted thereon, and a driving disk 48 transmits movement from the winding knob 45 to the cam disk 12 by means of a friction material 50. This arrangement thus provides a friction clutch between the cam disk 12 and the winding knob 45, the latter being secured to the spindle 13 by means of a screw 51, as clearly shown in Fig. 1. In order to rotate the driving disk 48 it may be provided with a lug 52 against which a pin 53 on the winding knob 45 is adapted to bear when the latter is rotated, as is apparent from an inspection of Fig. 1.

Figure 2:
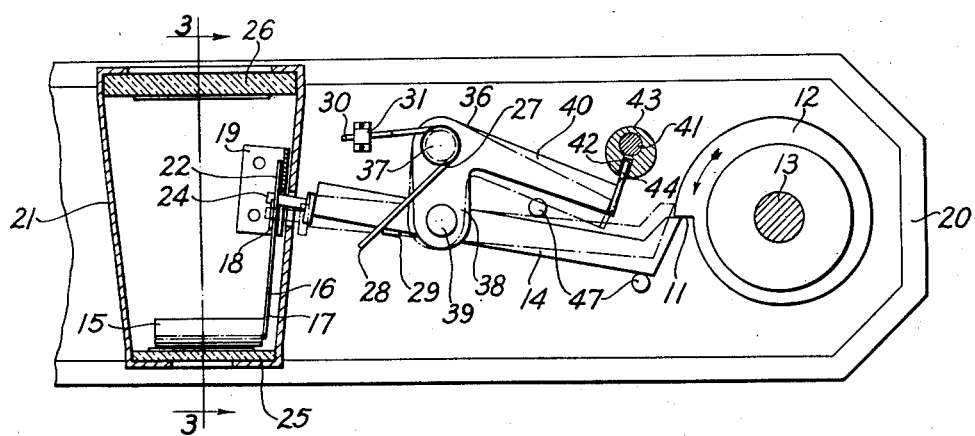
Fig. 2 is a plan view of the mechanism illustrated in Fig. 1, showing the relation of the various parts.

According to this preferred embodiment of the invention, when an exposed area of film is being wound into picture taking position, the shoulder 11 on the cam disk 12 will abut against the pivoted lever 14, see Fig. 2, which is then turned or moved about the pivot 39 against the action of the spring 27, and rotates the bellcrank lever 17 about its pivot 18 to carry the obscuring plate 15 so that the latter is moved into obscuring position in the field of the view finder 21 and between the lenses 25 and 26 thereof, as shown in dotted position, Fig. 3. However, the operator can still wind on film, since the driving disk 48 is capable of rotating relative to the cam disk 12 by reason of the slipping between these members.

Upon depression of the pressure knob 43, the cam slot 42 therein will engage the lug 44 and will turn the bellcrank lever 36 in a clockwise direction about its pivot 37 so that the pivoted lever 14 is first moved longitudinally away from the shoulder 11 on the cam disk 12, and is then turned on the pivot 39 by means of the spring 27 so that the obscuring plate 15 is again brought into obscuring position in the finder 21 and between the lenses 25 and 26 thereof by reason of the bellcrank lever 17 being rotated by the pivoted lever 14. It is thus apparent that the lever 14 has two movements, a longitudinal movement with its pivot 39, and a turning movement about its pivot. The bellcrank 36, therefore, provides a movable or floating support or pivot for the pivoted lever 14.

Instead of employing a plate which obscures the view finder, a point, disk, or other form of indicator may be employed, and, furthermore, such indicator may be mounted on any part of the camera where it will be visible to the operator.

It is thus apparent from the above description that the present invention provides a double exposure warning device which is moved to obscuring position in the view finder when the shutter trigger is operated, and is later moved to an unobstructing position when the film is wound to permit viewing through the finder. It is also apparent that the shifting means for the obscuring means is mounted for double movement on a bellcrank lever which affords a movable or floating support for the shifting means.

While one embodiment of the invention has been disclosed, it is to be understood that the inventive idea may be carried out in a number of ways. This application is therefore not to be limited to the precise details disclosed, but is intended to cover all variations and modifications thereof falling within the scope of the appended claims.

I claim:

1. In a camera, the combination with a film winding mechanism and a shutter actuating mechanism, of an exposure indicating member movably mounted on said camera and shiftable into and out of an indicating position, a lever operatively connected to said member to shift the latter, a bell crank mounted on said camera, said lever being pivotally mounted on one arm of said bell crank, means on said winding mechanism adapted to engage said lever to move the latter about said pivot to shift said member out of said position when the film has been wound, means on said shutter actuating mechanism adapted to engage the other arm of said bell crank when said shutter is operated to rock said bell crank to move said pivot and said lever as a unit to disengage the latter from said winding means, and a spring engaging said lever to move the latter about said pivot to shift said member into said position to indicate the making of an exposure.

2. In a camera, the combination with a film winding mechanism and a shutter actuating mechanism, of an exposure indicating member movably mounted on said camera and shiftable into and out of an indicating position, a lever operatively connected to said member to shift the latter, a bell crank mounted on said camera, said lever being pivotally mounted on one arm of said bell crank, a cam operatively connected to and controlled by said winding mechanism, a shoulder on said cam arranged to engage said lever to move the latter about said pivot to shift said member out of said position, means on said shutter actuating mechanism for rocking said bell crank upon operation of said shutter to move said one arm to shift said lever longitudinally to disengage the latter from said shoulder, and a spring mounted on said camera and engaging said lever to move the latter about said pivot to shift said member into said position to indicate the making of an exposure.

3. In a camera, the combination with a film winding mechanism and a shutter actuating mechanism, of an exposure indicating member movably mounted on said camera and shiftable into and out of an indicating position, means for shifting said member, a movable support for said shifting means, means connected to and controlled by said winding mechanism and adapted to engage said shifting means to move said member out of said position when the film has been wound, means whereby said last mentioned means is disconnected from said winding mechanism to permit further operation of the latter after said member has been moved out of said position, and means controlled by the operation of said shutter actuating mechanism for disengaging said shifting means from said winding mechanism and to shift said members into said position to indicate the making of an exposure.

4. In a camera, the combination with a film winding mechanism and a shutter actuating mechanism, of an exposure indicating member movably mounted on said camera and shiftable into and out of an indicating position, a lever operatively connected to said member to shift the latter, a bell crank mounted on said camera, said lever being pivotally mounted on one arm of said bell crank, a cam mounted on said winding mechanism, a friction clutch for connecting said cam in driving relation with said winding mechanism so that the operation of the latter to wind said film will actuate said cam, a shoulder on said cam arranged to engage said lever to move the latter about said pivot to shift said member out of said position, said clutch disconnecting said cam from said winding mechanism after said member has been shifted out of said position to permit additional operation of the winding mechanism, a cam on said shutter actuating mechanism adapted to engage the other arm of said bell crank to rock the latter upon operation of said shutter to move said one arm to shift said lever longitudinally to disengage the latter from said shoulder, and a spring mounted on said camera and engaging said lever to move the latter about said pivot to shift said member into said position to indicate that an exposure has been made.

5. In a camera having a body portion, the combination with a film winding mechanism, a shutter actuating mechanism, and a view finder carried by said body portion, of a bell crank pivotally mounted in said finder, an obstructing member carried by one arm of said bell crank and movable into and out of the field of said finder, a second bell crank pivotally mounted on said body portion, a lever pivoted on one arm of said second bell crank and having one end operatively connected to the other arm of said first bell crank, a cam carried by said film winding mechanism, means including a friction clutch for connecting said cam in operative relation with said winding mechanism, a shoulder on said cam adapted to engage the other end of said lever when said winding mechanism is operated to move said lever about its pivot to actuate said first bell crank to shift said obscuring member out of the field of said view finder, a stop for limiting further movement of said cam and lever when said member has been moved out of said field, said clutch then serving to disengage said cam from said winding mechanism to permit continued operation of the latter to wind the film, a cam on said shutter mechanism adapted to engage the other arm of said second bell crank to rock the latter when said shutter is actuated to move said lever longitudinally to disengage the other end thereof from said shoulder, and a spring on said body portion having a part thereof engaging said lever to move the latter about its pivot when disconnected from said shoulder to rock said first mentioned bell crank to shift said obscuring member into the field of said view finder.

HUGO NAGEL.